Nov. 27, 1956    B. R. BETTER ET AL    2,771,804
PREDETERMINED TORQUE RELEASE WRENCH
Filed May 9, 1955    3 Sheets-Sheet 1

Inventors:
Bernard R. Better
John W. Lehde, Jr.
By Glenn S. Noble, Atty.

Nov. 27, 1956  B. R. BETTER ET AL  2,771,804
PREDETERMINED TORQUE RELEASE WRENCH
Filed May 9, 1955  3 Sheets-Sheet 2

Inventors:
Bernard R. Better
John W. Lehde, Jr.
By Glenn L. Noble
Atty.

Nov. 27, 1956     B. R. BETTER ET AL     2,771,804
PREDETERMINED TORQUE RELEASE WRENCH
Filed May 9, 1955     3 Sheets-Sheet 3
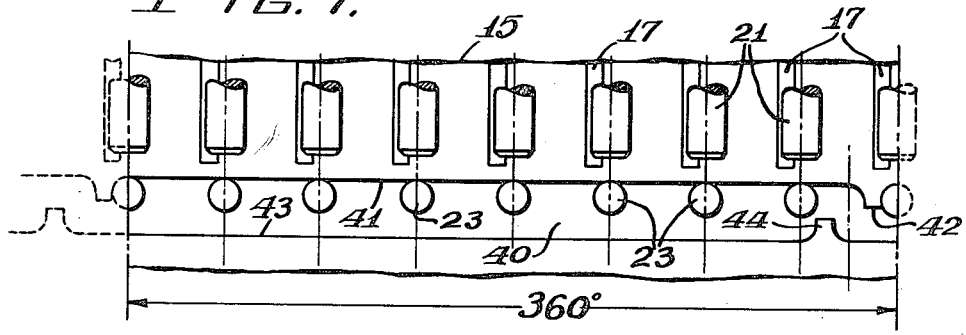
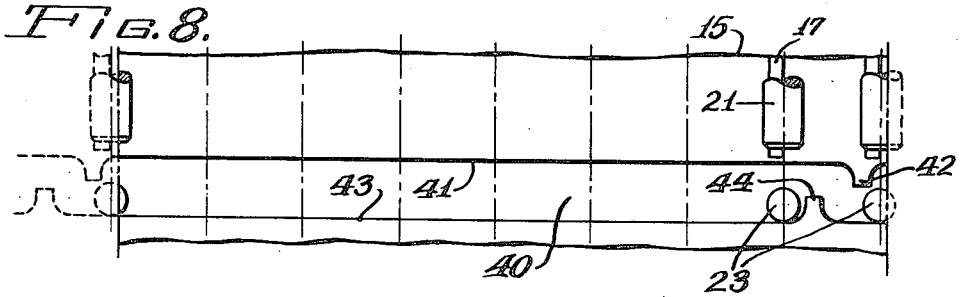
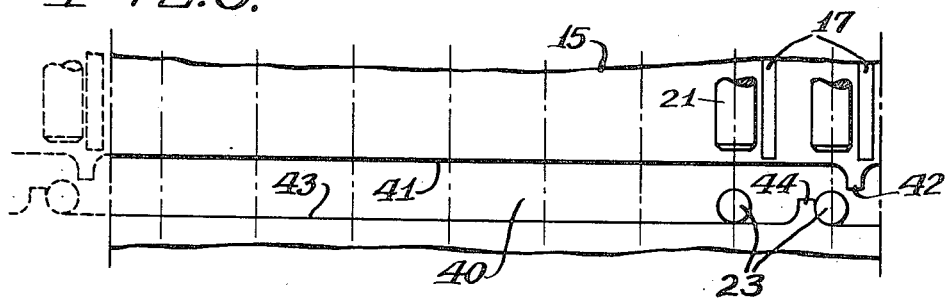
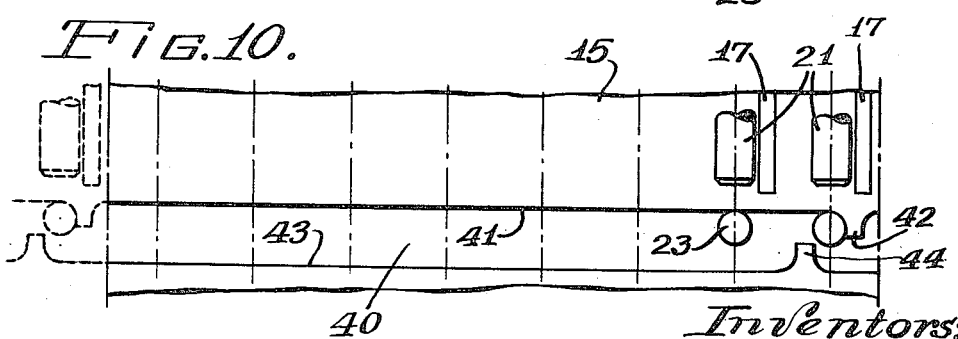
Inventors:
Bernard R. Better
John W. Lehde, Jr.
By Glenn S. Noble Atty.

United States Patent Office 2,771,804
Patented Nov. 27, 1956

2,771,804

PREDETERMINED TORQUE RELEASE WRENCH

Bernard R. Better and John W. Lehde, Jr., Chicago, Ill., assignors to Scully-Jones and Company, Chicago, Ill., a corporation of Illinois Application May 9, 1955, Serial No. 506,709

5 Claims. (Cl. 81—52.4)

This invention relates to means for applying predetermined amounts of torque to parts to be tightened or set such as nuts, bolts or the like.

The object of this device is to provide means for accurately controlling the tightening torque which may be applied to nuts, bolts, screws, studs and the like, and thereby reducing time consuming hand-checking procedures such as usually necessary to control the process when close limits are specified on the tightness of a threaded fastener; to provide a tool or device of this character which may be used with various sources of power such as rotary, pneumatic or electric or portable or stationary power tools in assembly operations.

Among the advantages of this invention is an improvement over methods previously used for tightening nuts or the like in that it eliminates the necessity for air pressure control when used with pneumatic tools. It also reduces the amount of the attention required from the operator, thus enabling less skilled personnel to be used. It completely releases at the specified torque and will not increase the tightness of the nut or other member to be tightened, regardless of the length of time it is applied after releasing.

Other advantages and improvements will be apparent from the following description taken in connection with the accompanying drawings in which, Fig. 1 is a longitudinal sectional view of a device embodying our invention, showing the tool or driver in normal "free wheeling" position or position where no torque is being delivered.

Figs. 6–10 inclusive are diagrammatic views showing the operation of the driving rollers and reset balls in connection with the control track whereby the balls will hold the rollers in predetermined positions with respect to the driving cams or ridges.

Figure 1:
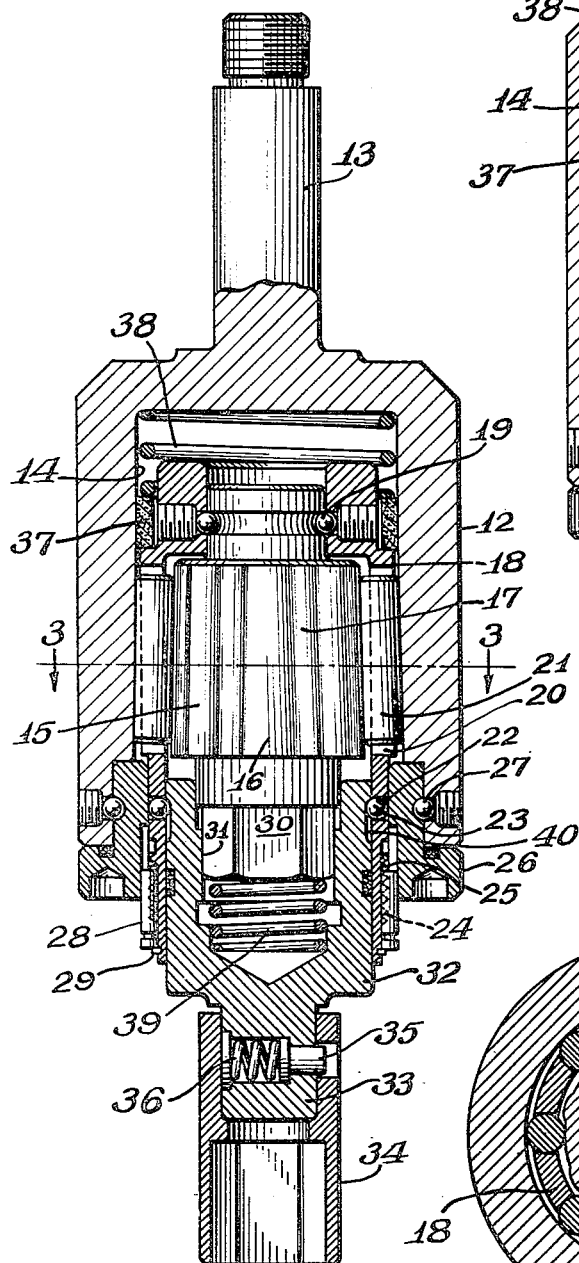
Figure 3:
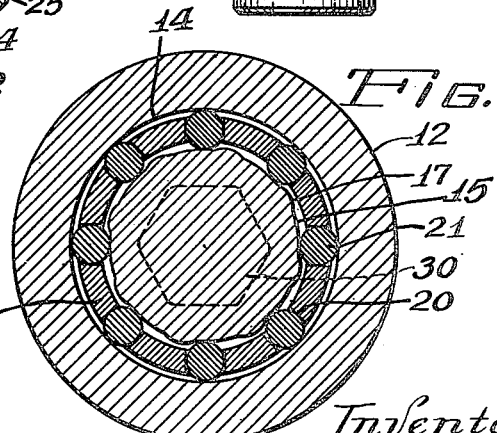
Fig. 3 is a cross sectional view taken substantially on the line 3—3 of Fig. 1.
Figure 4:
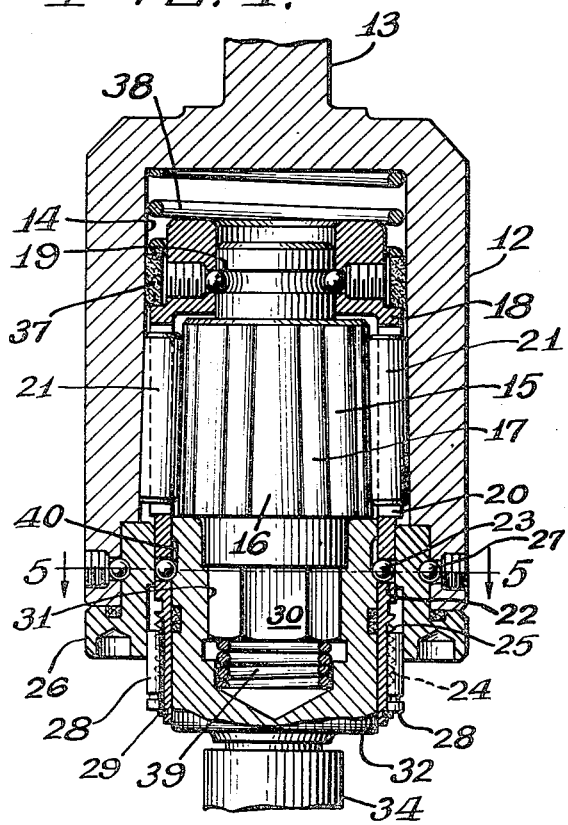
Fig. 4 is also a sectional view showing parts substantially in the same position as in Fig. 2.
Figure 5:
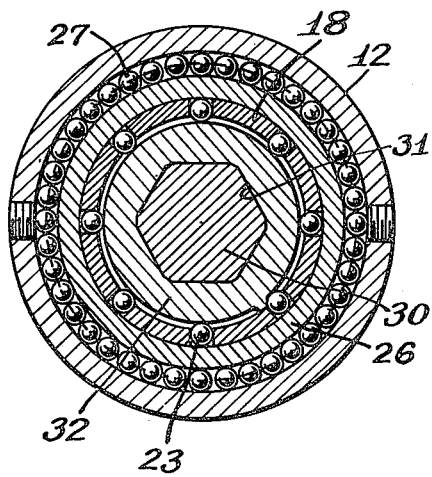
Fig. 5 is a cross sectional view taken on the line 5—5 of Fig. 4.
Figure 6:
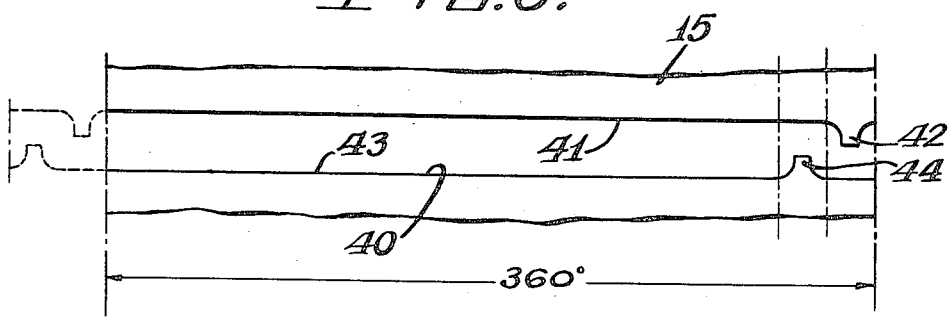

Our safe torque nut setter or driver has a driving member or shell 12 which is provided with a shank 13 or other suitable means for attaching it to a driving tool. The inner bore 14 is tapered decreasingly toward the shank or inner end. A driven member 15 is mounted in the driving member and has an enlarged portion 16 which is tapered to correspond with the tapered bore of the driving member and is provided with longitudinal or axially extending cams or ridges 17 as shown in Figs. 1 and 3.

Figure 2:
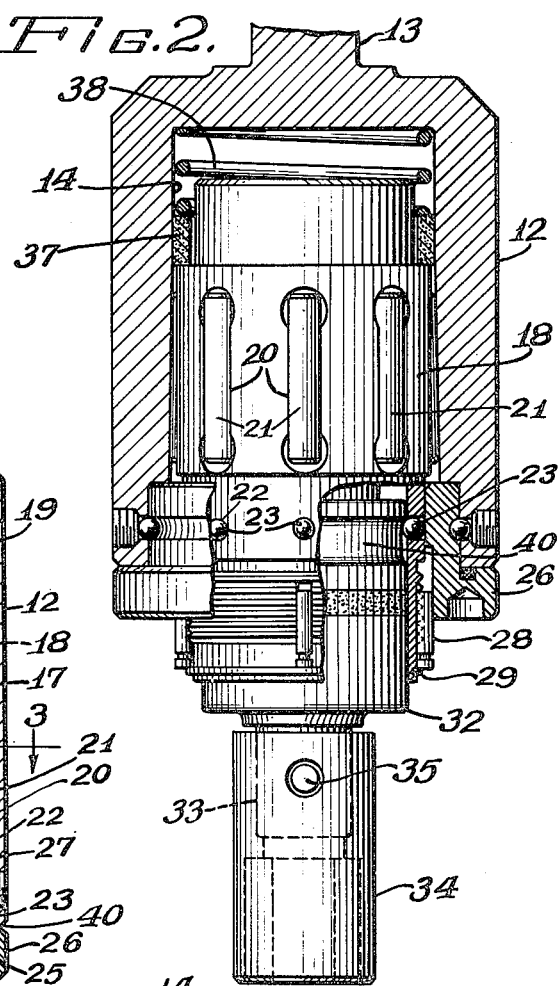
Fig. 2 is a view similar to Fig. 1 but showing the driving rollers and cage and other parts in full and the driver in position for driving.

A roller cage 18 fits loosely into the bore of the driving member and over the tapered portion of the driven member and is held in axial position with respect to the driven member by retaining balls 19. The cage 18 is provided with slots 20 for receiving the driving rollers 21 which fit closely within the slots to prevent them from cocking and to keep them equally spaced. The cage is also provided with radially extending holes 22 equal in number to the number of rollers and in alignment with the roller slots as shown in Fig. 2. These holes contain the reset balls 23, the operation of which will be described hereinafter.

The cage is provided with external threads 24 which engage with internal threads 25 in an adjusting nut or sleeve 26 which is mounted in the driving member and held in position by retaining balls 27. The adjusting nut 26 is prevented from rotating with respect to the cage by means of lock pins 28 which fit into suitable slots in the cage and adjusting nut as shown in Figs. 1 and 2, and are held in position by spring retaining ring 29.

The driven member 15 has a longitudinal non-circular or hexagonal projection 30 on the end opposite to the one containing the ball groove for the retaining balls 19. This projection has a sliding fit with a similarly shaped hole or recess 31 in the socket driver 32 which provides a connection through which torque may be transmitted to the nut or fastener to be tightened. The socket driver is provided at one end with suitable means such as a square projection 33 for receiving the square end of a socket 34 of any ordinary or preferred form for attachment to the nut or part to be driven. The socket may be held in position by any of the usual means such as employed in socket wrenches, such means being shown as a socket retaining pin 35 and spring 36 as shown in Fig. 1.

The friction washer 37 surrounds the reduced end of the cage and is pressed toward the cage by means of a spring 38, the opposite end of which engages the closed end of the driver as shown in Fig. 1.

A reset spring 39 is positioned between the projection 30 and the bottom of the hole in which it extends, and exerts an outward pressure on the socket driver 32.

When the driver is to be used for tightening a nut, the retaining ring 29 and the lock pins 28 are removed and the adjusting nut rotated with respect to the cage to adjust the position of the cage in the driving member. When the cage is prevented from turning while the adjusting nut is rotated, the action of the threaded connection will cause the driven member and parts associated therewith to move axially into or out of the driving member depending upon the direction of rotation. Movement into the driving member will reduce the clearance between the tapered bore of the driving member and the tapered portion 16 of the driven member 15. This causes more torque to be delivered. At the same time, it increases the amount of torque required to cause the rollers to pass over the cams or ridges formed on the driven member. Movement of the driving member out of or away from the driven member will result in the opposite effect and lessen the tightening torque which will be applied to the nut or fastener.

The operation of the setter will be understood from the diagrammatic illustrations in Figs. 7 to 10. The socket driver 32 is provided with a peripheral groove or channel 40 having an upper wall 41 provided with a projection 42 as shown in Fig. 7. The lower wall or side 43 has an upwardly extending projection 44. As shown in Fig. 7, the driven member 15 with its cams 17 is shown with the rollers 21 adjacent to the cams and also shows the position of the reset balls 23 in the channel or track 40. This view may be considered as showing the parts when the nut setter is in normal position at which time the reset spring 39 exerts an outward pressure on the socket driver 32 so that the reset ball track is located to bring the reset balls in contact with the shoulder or wall 41. In this position, one of the reset balls will strike the stop lug 42 and prevents any rotation or movement of the roller cage with respect to the driven member. Thus the rollers are prevented from contacting the drive cams or ridges, and since this portion of the driven member is so formed to provide clearance between the tapered bore of the driving member and the tapered portion of the driven member, greater than the diameter of the rollers, the rollers will not contact the driven member and the tool will not deliver any torque.

Fig. 8 shows the position of the parts of the setter under consideration when a light downward pressure is applied to the socket driver 32. This pressure causes the reset spring 39 to be compressed and allows the socket driver to move toward the driving member until the reset balls strike the outermost shoulder or wall 43 of the reset ball track. At this time, the reset ball shown in contact with the stop lug 42 in Fig. 7 is now in position to move past the stop lug.

The slight resistance to turning offered by the nut being tightened in this operation will be sufficient to retard the rotation of the driven member so that the driving member will rotate with respect to the driven member. The friction coupling 37 between the body and the cage will then force the cage to rotate with respect to the driven member until the rollers contact the cams or ridges and become wedged between the driving member and the cams. The entire tool will then operate as a solid unit until the fastener has reached the predetermined tightness.

When the nut has been sufficiently tightened, the forces acting on the driving member through the rollers will be sufficient to cause radial deformation of the driving member and allow their rollers to ride over the cams or ridges. After this occurs, the reset ball will strike the stop lug 44 as shown in Fig. 8 and will hold the rollers in "free wheeling" position due to the space provided between the driving and driven members between the respective cams, and no further torque will be applied to the fastener although the driving member is free to continue turning.

When the nut setter is removed from the nut or member being fastened, or the light downward pressure is relieved, the reset spring will force the socket driver in an outward direction until the reset balls contact the innermost shoulder 41 of the reset ball track as shown in Fig. 10. When the reset ball is in this position, it can move past the stop lug 44. The action of the friction coupling 37 will again cause rotation of the cage relative to the driven member until the next reset ball strikes the stop lug 42. The tool is then ready for another cycle of operation.

Having thus described our invention, what we claim is:

1. In a nut setter, the combination of a driving member having a tapered bore, a driven member mounted in said driving member and having a tapered portion opposed to the tapered bore and having a plurality of longitudinal evenly spaced cams on the tapered portion with non-driving areas between the cams, a roller cage, rollers in said cage for engagement with said tapered and cam surfaces, means for adjusting the driven member axially with respect to the driving member for increasing or decreasing the driving torque, and means for connecting the driven member to the nut to be set.

2. A safe torque nut setter, comprising a driving shell having a longitudinally tapered inner bore, a driven member having a tapered portion complementary to said bore, longitudinal cams on said tapered portion, rollers adapted to engage at times with said tapered portions, a cage for said rollers, means for fastening the cage to the driven member to hold it axially in position, means for adjusting the cage axially with respect to the shell, a socket driver having a driving connection with said driven member, spring means tending to hold the socket driver in projected position, and means for connecting the socket driver with a nut to be set.

3. A drive of the kind set forth, comprising a driving shell, a driven member mounted in the shell, a roller cage between said members, rollers mounted in said cage, radial holes in the cage in alignment with each of the rollers, reset balls mounted in said holes, a socket driver having a slidable connection with the driven member, a spring tending to hold the socket driver in extended position, said socket driving member having a circumferential ball track for the reset balls, said track having oppositely disposed lugs for stopping the balls to hold the cage in predetermined positions.

4. In a device for acting on threaded members, the combination of a driving member having a tapered bore, a driven member axially mounted in the driving member and having a tapered portion opposed to the taper of the driving member with longitudinal driving ridges and non-driving spaces in the driven member between said ridges, a roller cage, means for holding the cage in axial position with respect to the driven member, a friction bearing between the driving member and the cage tending to turn the cage with the driving member, means for adjusting the cage and parts connected therewith axially with respect to the driving member, a socket driver slidably mounted on the driven member, a spring tending to hold the socket driver in projected position, reset balls mounted in holes in the cage, a reset ball track in the socket driver having projections to stop the balls in predetermined positions, and means for connecting the socket driver with the threaded member.

5. In a tightening tool, the combination of a metallic integral, elastic driving member having a tapered bore, a driven member mounted in said driving member and having a tapered portion opposed to the tapered bore and having a plurality of longitudinal cams on the tapered portion with non-driving areas between the cams, a roller cage, rollers in said cage for engagement with said tapered surfaces, means for adjusting the driven member axially with respect to the driving member for increasing or decreasing the driving torque, the arrangement being such that when the part to be acted upon has been sufficiently tightened, the forces acting upon the driving member through the rollers will be sufficient to cause radial deformation of the driving member and allow the rollers to ride over the cams and into the non-driving spaces, and means for connecting the driven member with the part to be acted upon.

References Cited in the file of this patent

UNITED STATES PATENTS

| | | |
|---|---|---|
| 2,250,736 | Torresen | July 29, 1941 |
| 2,305,637 | Ricciardi | Dec. 22, 1942 |
| 2,441,038 | Silsel | May 4, 1948 |
| 2,461,447 | Silsel | Feb. 8, 1949 |
| 2,536,225 | Rice | Jan. 2, 1951 |
| 2,634,640 | Pedersen | Apr. 14, 1953 |
| 2,687,054 | Nelson | Aug. 24, 1954 |
| 2,708,836 | Stuart | May 24, 1955 |